United States Patent
Kaplan et al.

(10) Patent No.: US 10,848,557 B2
(45) Date of Patent: *Nov. 24, 2020

(54) SERVER-SIDE SELECTIVE SYNCHRONIZATION

(71) Applicant: DROPBOX, INC., San Francisco, CA (US)

(72) Inventors: Joshua Kaplan, San Francisco, CA (US); Isaac Goldberg, San Francisco, CA (US); John Lai, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,397

(22) Filed: Aug. 5, 2019

(65) Prior Publication Data

US 2019/0364107 A1 Nov. 28, 2019

Related U.S. Application Data

(63) Continuation of application No. 14/950,901, filed on Nov. 24, 2015, now Pat. No. 10,397,319.

(51) Int. Cl.
*H04L 29/08* (2006.01)
*G06F 16/178* (2019.01)
*G06F 16/23* (2019.01)

(52) U.S. Cl.
CPC ........ *H04L 67/1095* (2013.01); *G06F 16/178* (2019.01); *G06F 16/2379* (2019.01); *H04L 67/303* (2013.01); *H04L 67/02* (2013.01); *H04L 67/20* (2013.01)

(58) Field of Classification Search
USPC .......................................... 709/217
See application file for complete search history.

(56) References Cited

U.S. PATENT DOCUMENTS

| | | | |
|---|---|---|---|
| 6,625,623 | B1 | 9/2003 | Midgley et al. |
| 6,636,897 | B1 | 10/2003 | Sherman et al. |
| 6,725,239 | B2 | 4/2004 | Sherman et al. |
| 7,320,011 | B2 | 1/2008 | Koskimies |
| 7,366,861 | B2 | 4/2008 | Manchester et al. |
| 7,653,664 | B2 | 1/2010 | Chitre et al. |
| 7,962,575 | B2 | 6/2011 | Glatt et al. |
| 8,380,663 | B2 | 2/2013 | Thode |
| 8,650,498 | B1 * | 2/2014 | Mihovilovic ......... G06F 16/178 715/763 |
| 8,825,597 | B1 | 9/2014 | Houston et al. |
| 2006/0101064 | A1 * | 5/2006 | Strong .................... G06F 16/51 |

(Continued)

FOREIGN PATENT DOCUMENTS

EP     2891108 A2     7/2015

*Primary Examiner* — Hermon Asres
(74) *Attorney, Agent, or Firm* — Polsinelli PC

(57) ABSTRACT

A content management system can maintain the entirety of a user account's content library. As a default behavior, updates made to the content library when accessed from any client device authorized by the user account, including adding, modifying, and/or deleting content items, can be synchronized across all other authorized client devices. A user can opt out of the default behavior and specify, for each authorized client device, certain portions of the content library that the content management system should or should not synchronize.

20 Claims, 8 Drawing Sheets

(56) References Cited

U.S. PATENT DOCUMENTS

| | | | |
|---|---|---|---|
| 2007/0250645 A1* | 10/2007 | Meadows | H04L 67/1095 |
| | | | 709/248 |
| 2008/0168245 A1* | 7/2008 | De Atley | G06F 11/1451 |
| | | | 711/162 |
| 2009/0177699 A1* | 7/2009 | Rosenblatt | G06F 16/24562 |
| 2009/0228509 A1* | 9/2009 | McCarthy | H04L 67/1095 |
| 2010/0262582 A1 | 10/2010 | Garcia-Ascanio et al. | |
| 2012/0291102 A1* | 11/2012 | Cohen | G06F 21/57 |
| | | | 726/4 |
| 2014/0019497 A1 | 1/2014 | Cidon et al. | |
| 2014/0157131 A1 | 6/2014 | Mihovilovic | |
| 2014/0195638 A1 | 7/2014 | Houston | |

* cited by examiner

| Content Pointer 602 | Content Library Identifier 604 | Content Journal Number 606 | Content Path 608 | Latest Flag 610 | Directory Flag 612 | Content Size 614 | Sync Field 616 |
|---|---|---|---|---|---|---|---|
| 0001 | 178 | 1 | /Readme.txt | True | False | 85 | 0 |
| Null | 178 | 2 | /Photos | True | True | 0 | 0 |
| 1002 | 178 | 3 | /Photos/Face.jpg | True | False | 9321 | 0 |
| Null | 178 | 4 | /DoNotSync | True | True | 0 | 1 |

FIG. 6

SERVER-SIDE SELECTIVE SYNCHRONIZATION

CROSS-REFERENCE TO RELATED APPLICATIONS

This application is a continuation of U.S. patent application Ser. No. 14/950,901, filed on Nov. 24, 2015 and entitled "SERVER-SIDE SELECTIVE SYNCHRONIZATION", the contents of which are incorporated herein in their entirety.

TECHNICAL FIELD

The present technology pertains to a content management system, and more specifically pertains to selectively synchronizing portions of a content library across client devices via the content management system.

BACKGROUND

A content management system can store a user's content library remotely from the user and provide access to the content library from a variety of client devices. Some content management systems may synchronize the content library across multiple client devices, such as when the user is associated with multiple devices or multiple users share at least a portion of the content library. A conventional content management system may treat synchronization passively and require a user to manually designate a content item for synchronization before the system synchronizes the content item across the user's devices and other users' devices sharing the content item. This can be onerous for the user and can lead to inconsistencies for her content library. For example, to synchronize the content item between two client devices, the user must upload changes made to the content item on a first client device to replace a previous version of the content item stored by the conventional content management system and download the changed content item to the second client device to replace the previous version of the content item stored on the second client device. If the user makes revisions to the content item stored on the second client device without first downloading the changed content item, the revisions made to the content item on the first client device may not be reflected in a version of the content item stored on the second client device, and vice versa. These difficulties can be exacerbated when the user is associated with additional client devices.

Another implementation of a content management system can use an active approach to synchronization and automatically update a content library across all client devices authorized by a user account. This design improves upon the passive, conventional content management system by alleviating the user of the burden of having to manually designate her content library for synchronization and separately manage synchronization for her multiple devices. A potential drawback to active or automatic synchronization techniques, however, can be less customization for apportioning the user account's content library across authorized client devices. One known approach for supporting "selective" synchronization (e.g., the capability of designating the exact content items of a content library to be synchronized within an automated synchronization scheme) relies entirely on the client device. Although client-side selective synchronization is viable in certain respects, it is an incomplete solution because synchronization is still limited to customization on a per device basis.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for a content management system to selectively synchronize different portions of a content library for multiple client devices authorized by a user account. Synchronizing can include sending changes made to the content library stored on a first client device to the content management system and other authorized client devices. A content library can include any number of individual content items. A content item can be any type of file such as a document, text file, audio file, video file, etc. Further, a content item can be a folder or other mechanism of grouping content items together. Selective synchronization enables a single client device, authorized by the user account, to specify particular content items in the content library that a content management system should or should not synchronize for multiple client devices authorized by the user account.

A content management system can maintain the entirety of a content library associated with the user account. As a default behavior, updates made to the content library when accessed from any client device authorized by the user account, including adding, modifying, and/or deleting content items, can be synchronized across all other authorized client devices. A user can opt out of the default behavior and specify, for each authorized client device, certain portions of her content library that the content management system should or should not synchronize.

The content management system can introduce a new attribute for a content item, a synchronization state. The synchronization state can be a field or a flag indicating whether the content item is synchronized or unsynchronized for each client device authorized by the user account. The content management system will ensure a content item that is designated as synchronized is consistent across each client device authorized by the user account having the same synchronization state. Updates to a content item set to the unsynchronized state on a particular client device, on the other hand, will not be reflected across any other client devices authorized by the user account. The content management system will ignore changes to those content items, and the content system will not update those content items with changes from other client devices.

The synchronization state is maintained on a per device basis. Each client device authorized by a user account can have a unique synchronization state scheme. Although, in some situations, a particular synchronization state scheme can be used as a template that the content management system can propagate as desired. By implementing selective synchronization from the server-side, a user can configure synchronization settings of any authorized client device from any other authorized client device or even another unauthorized client device via a web-based interface.

Although not necessary in all embodiments, one implementation of selective synchronization integrates with an existing synchronization protocol. Changes to the synchronization state of a content item can be recorded along with other content item updates like add, modify, or delete actions. When a client device synchronizes with the content management system, the content management system can process those synchronization state changes like any other content library update. One potential wrinkle is that each client device can have an independent synchronization scheme. Thus, the content management system can maintain a "blacklist" for each client device. The blacklist for a client device can identify the content items that the content management system does not synchronize. When the content management system synchronizes with the client device, the content management system can check against the blacklist to determine whether to apply an update action for a content item.

A number of applications can arise from selective synchronization. The content management system can handle memory constraints more elegantly. For example, when a client device has insufficient memory for a content library update, the content items associated with the update can be designated as unsynchronized. Later, when there is sufficient memory, those content items can be reverted back to the synchronized state. As another example, filtering rules can be used to automate synchronization of content items, allowing for greater customization. A content management system can support both a blacklist model and/or whitelist model for synchronization. Several other functions and advantages are described and suggested below in accordance with various embodiments.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6 shows an exemplary content journal;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for enabling a user to selectively synchronize portions of a local copy of a content library maintained by a content management system that implements active or automatic synchronization. From any client device authorized by a user account or a web interface provided by the content management system, the user may customize the synchronization state of any content item of the content library stored on any other authorized client device. Synchronization settings can be customized on a per client device basis to account for differences among authorized client devices, such as a primary mode of operation (e.g., work computer versus personal computer), hard drive memory space, network connection, security, supported media types, etc.

Figure 1:
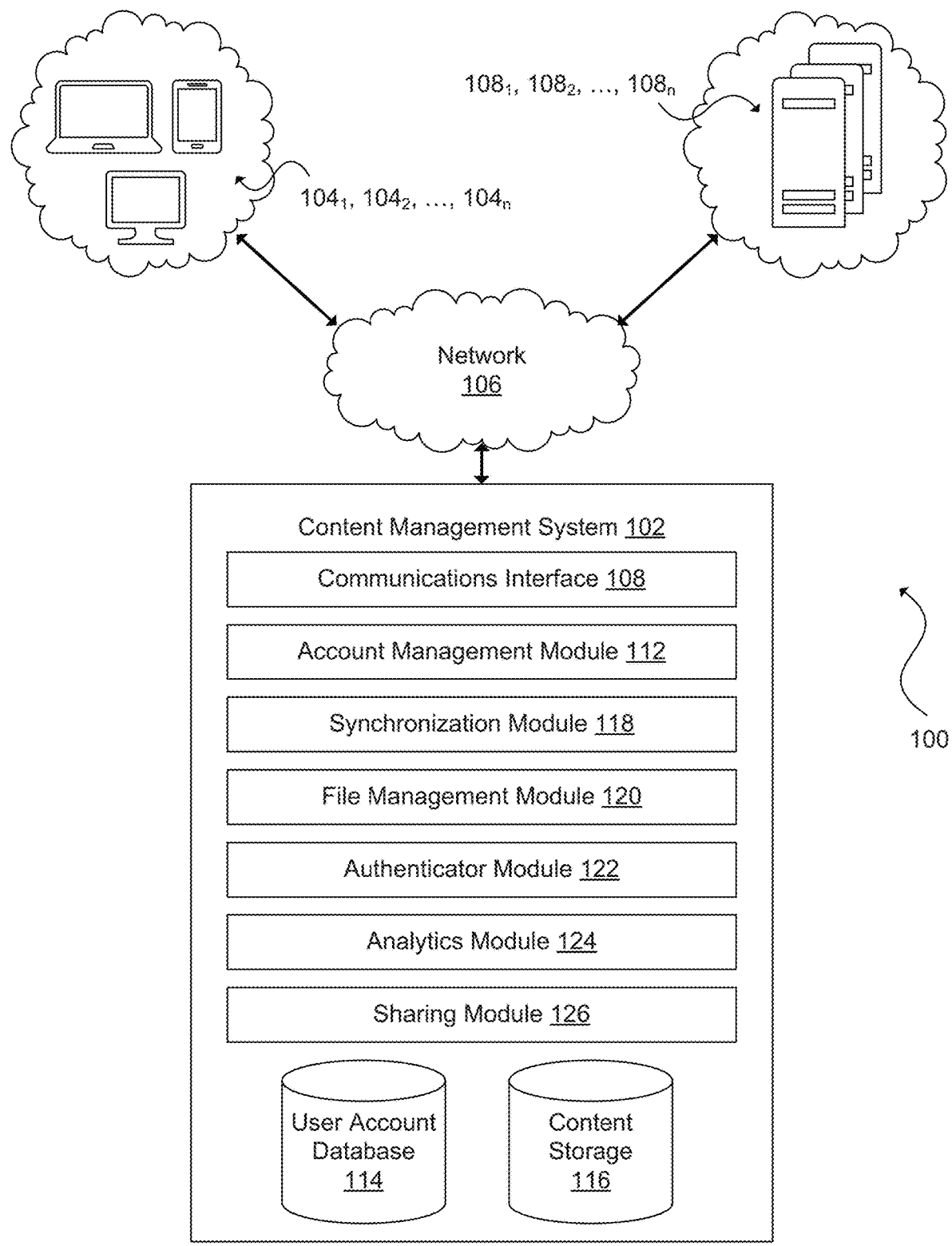
FIG. 1 shows an exemplary configuration of devices and a network in accordance with the invention.

With respect to implementing various embodiments of the disclosed technology, an exemplary system configuration 100 is shown in FIG. 1, wherein electronic devices communicate via a network for purposes of exchanging content and other data. The system can operate in a wide area network (WAN), such as the Internet. However, the present principles are applicable to a wide variety of network configurations that facilitate the intercommunication of electronic devices. For example, each of the components of system 100 in FIG. 1 can be implemented in a localized or distributed fashion in a private network.

In system 100, a user can interact with content management system 102 through client devices $104_1$, $104_2$, . . . , $104_n$ (collectively, "104") connected to network 106 by direct and/or indirect communication. Content management system 102 can support connections from a variety of different client devices, such as desktop computers; mobile computers; mobile communication devices, e.g. mobile phones, smart phones, tablets; smart televisions; set-top boxes; and/or any other network enabled computing devices. Client devices 104 can be of varying type, capabilities, operating systems, etc. Furthermore, content management system 102 can concurrently accept connections from and interact with multiple client devices 104.

Content management system 102 can include a communications interface 108, such as an Application Programming Interface (API), for interfacing with client devices 104. Content management system 102 can also interact with other content and/or service providers $110_1$, $110_2$, . . . , $110_n$ (collectively, "110") via the API. Certain software applications can access content management system 102 via the API on behalf of a user. For instance, a software package, such as an app on a smartphone or tablet computing device, can programmatically make calls directly to content management system 102, when a user provides credentials, to read, write, create, delete, share, or otherwise manipulate content. Similarly, the API can allow users to access all or part of content management system 102 through a web site.

A user can interact with content management system 102 via a client-side application installed on client device $104_i$. In some embodiments, the client-side application can include a content management system specific component. For example, the component can be a stand-alone application, one or more application plug-ins, and/or a browser extension. However, the user can also interact with content management system 102 via a third-party application, such as a web browser, that resides on client device $104_i$ and can be used to communicate with content management system 102. In either case, the client-side application can present a user interface (UI) for the user to interact with content management system 102. For example, the user can interact with the content management system 102 via a client-side application integrated with the file system or via a webpage displayed using a web browser application.

To facilitate the various content management services, a user can create an account via account management module 112. Account information can be maintained in user account database 114. Account management module 110 can update and/or obtain user account details in user account database 114. Account management module 110 can interact with any number of other modules in content management system 102.

User account database 114 can store profile information for registered users. User account database 114 can also include account management information, such as account type (e.g. free or paid), usage information (e.g., file edit history), maximum storage space authorized, storage space used, content storage locations, security settings, personal configuration settings, content sharing data, etc. In some cases, the only personal information in the user profile can be a username and/or email address. However, content management system 102 can also accept additional user information.

User account database 114 can also store client device information on a per device basis. For example, a user can possess multiple client devices, such as a work computer, a personal computer, a tablet, a phone, etc. The user may want full access to her content library on each of her client devices instead of access via a website because she may not be connected to a network at all times or would prefer not to use certain devices to download a content item due to limitations on network bandwidth or data usage. The user can therefore install a client-side application provided by content management system 102 on each client device. After the user has installed the client-side application on client device $104_i$, content management system 102 can store in user account database 114 information about client device $104_i$, such as a unique identifier for client device $104_i$, a display name for client device $104_i$ (e.g., "My PC," "John's Mobile," "Tablet 2," etc.), a type of client device $104_i$ (e.g., desktop computer, mobile computer, mobile communication device, etc.), a manufacturer/model, an operating system, available memory space, client device $104_i$ capabilities (e.g., CPU speed, types of network connectivity, installed software, etc.), and a synchronization blacklist.

A synchronization blacklist for client device $104_i$ can include a list of content paths of each content item in the user's content library that content management system 102 can use to exclude from synchronization on client device $104_i$. That is, content management system 102 will not synchronize content items associated with the content paths in the blacklist during an update of a local copy of the content library on client device $104_i$. Thus, changes to the remote copies of the blacklisted content items may have no effect on corresponding local copies on the client device $104_i$, and changes to the local copies of the blacklisted content items may have no effect on corresponding remote copies on the content management system 102.

In one optimization, the blacklist may include universally unique identifiers (UUIDs) of unsynchronized content items instead of content paths. This can decrease the amount of memory needed to store the blacklist. This can also significantly improve synchronization in the event that a user renames or moves a content item in her content library. For example, a conventional content management system may rely on a content path to identify synchronized content items. In the situation of the user renaming or moving a synchronized content item, which changes the content path of the synchronized item, the conventional content management system can cause every authorized client device to delete a previous version of the content item and re-download the renamed or moved content item during synchronization. By using a UUID instead of a content path, content management system 102 can determine that a modification to a content library merely amounts to a rename or a move and send synchronization data to rename or move that content item as appropriate.

In one variation, user account database 114 can store a synchronization whitelist for client device $104_i$ instead of a blacklist. A synchronization whitelist for client device $104_i$ can include a list of content paths that content management system 102 uses to synchronize associated content items during synchronization between content management system 102 and client device $104_i$. It will be appreciated by one of ordinary skill that content management system 102 can utilize both a synchronization blacklist and whitelist. For example, content management system 102 can allow a user to configure whether content management system 102 uses a blacklist and/or a whitelist. As another example, content management system 102 can select between a synchronization blacklist and a synchronization whitelist to optimize the synchronization process, consume less network data, and/or use less memory. For instance, if a user desires to exclude substantially more content items than include for synchronization, the synchronization process may perform fewer operations using a synchronization whitelist. Further, the synchronization process may use less network data, and storing the whitelist may take up less memory than a blacklist. As yet another example, utilizing a synchronization whitelist may be preferable for mobile communication devices that may have constraints on hard drive memory space and network bandwidth and data usage.

An account can be used to store a content library including content items such as digital data, documents, text files, audio files, video files, etc., from one or more client devices 104 authorized on the account. The content library can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photo directory that is intended for photos and that provides specific attributes and actions tailored for photos; an audio directory that provides the ability to play back audio files and perform other audio related actions; or other special purpose directories or folders. An account can also include shared folders or group folders that are linked with and available to multiple user accounts. The permissions for multiple users may be different for a shared folder.

A content library can be stored in content storage 116. Content storage 116 can be a storage device, multiple storage devices, or a server. Alternatively, content storage 116 can be a cloud storage provider or network storage accessible via one or more communications networks. Content management system 102 can hide the complexity and details from client devices 104 so that client devices 104 do not need to know exactly where the content library is being stored by content management system 102. In one variation, content management system 102 can store the content library in the same folder hierarchy as a local copy of the content library on client device $104_i$. However, content management system 102 can store the content library in its own order, arrangement, or hierarchy. Content management system 102 can store the content library in a network accessible storage (SAN) device, in a redundant array of inexpensive disks (RAID), etc. Content storage 116 can store the content library using one or more partition types, such as FAT, FAT32, NTFS, EXT2, EXT3, EXT4, ReiserFS, BTRFS, and so forth.

Content storage 116 can also store metadata describing a content library, content item types, and the relationship of content items to various accounts, folders, or groups. The metadata for a content item can be stored as part of the content item or can be stored separately. In one variation, each content item stored in content storage 116 can be assigned a UUID.

Content storage 116 can decrease the amount of storage space required by identifying duplicate files or duplicate segments of files. Instead of storing multiple copies, content storage 116 can store a single copy and then use a pointer or other mechanism to link the duplicates to the single copy. Similarly, content storage 116 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 102 can support automatic synchronization of a content library among and between one or more client devices 104 and content management system 102 via synchronization module 118. Synchronization can be platform agnostic. That is, the content library can be synchronized across multiple client devices 104 of varying type, capabilities, operating systems, etc. For example, client device $104_i$ can include client software, which interfaces with synchronization module 118, to synchronize a local copy of the content library in client device $104_i$'s file system with a local copy of the content library in another client device $104_j$. In some cases, the client software can synchronize any changes to local copy of a content library in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate a local copy of a content library directly in a local folder, while a background process monitors the local folder for changes and synchronizes those changes with the content library on content management system 102. Conversely, the background process can identify content that has been updated at the content library on content management system 102 and synchronize those changes to the local folder. The client software can provide notifications of synchronization operations, and can provide indications of content statuses directly within the client software. Sometimes client device $104_i$ may not have a network connection available. In this scenario, the client software can monitor the local folder for file changes and queue those changes for later synchronization to content management system 102 when a network connection is available. Similarly, a user can manually stop or pause synchronization with content management system 102.

Although content management system 102 may implement active or automatic synchronization, content management system 102 can also support selective synchronization or synchronization of portions of a content library across multiple client devices. For example, a user, via a client-side application, can modify a synchronization state of a local copy of a content item of the content library, such as changing the synchronization state of the local copy of the content item from synchronized (e.g., being included in synchronization between client device $104_i$ and content management system 102) to unsynchronized (e.g., being excluded from synchronization) or vice versa. The next time synchronization occurs between client device $104_i$ and content management system 102, content management system 102 can receive the modified synchronization state and update client device $104_i$'s synchronization blacklist/whitelist in user account database 114. The synchronization protocol may reflect the modified synchronization state. For instance, if the synchronization state for the local copy of the content item changed from unsynchronized to synchronized, content management system 102 can cause client device $104_i$ to retrieve the content item. On the other hand, if the synchronization state for the local copy of the content item changed from synchronized to unsynchronized, content management system 102 can ignore any changes made to the local copy of the content item after the point the synchronization state of the local copy of the content item changed.

In one example, changing a synchronization state of a content item from synchronized to unsynchronized on client device $104_i$ can cause client device $104_i$ to delete a local copy of the content item and replace the content item with a stub (e.g., an empty, preferably inaccessible directory or a file having zero or substantially zero file size). Prior to deleting the content item (or the contents of the content item if the content item is a directory), a client-side application can warn the user that the local copy of the content item will be deleted and give the user an opportunity to move the local copy of the content item to a location outside of the root directory of the local copy of the content library or to back up the local copy of the content item by renaming the local copy of the content item. The client-side application can automatically designate the renamed local copy of the content item as unsynchronized in the latter case so that content management system 102 does not attempt to synchronize the renamed local copy of the content item. Client device $104_i$ can still access a copy of the content item, such as a remote copy of the content item maintained by content management system 102 or a local copy of the content item on another associated client device $104_j$. Content management system 102 may use such an approach to avoid a potentially substantial number of conflicts between the local copy of the content item and the content item in content storage 116 in the event a user retains an old version of the content item and opts to "re-sync" a local copy of the content item.

Content management system 102 can include file management module 120, which can create and update a content journal used for managing a content library and synchronizing the content library between and among content management system 102 and client devices 104. A content journal can be a list of content entries, each associated with a content item in the content library. Each content entry can include a content path that can be used to identify the location of the content item in content management system 102. For example, the content path can include the name of the content item and a folder hierarchy (e.g., folder or path of folders) associated with the content item. Content management system 102 can use the content path to present the content items of the content library in the appropriate folder hierarchy.

In one example, a content entry can include a field or flag indicating that the content entry comprises a change of a synchronization state of a content item. For example, a value of 0 or null can indicate that the content entry is an add, modify, or delete action, a value of 1 can indicate that the synchronization state of the content item should be changed to unsynchronized, and a value of 2 can indicate that the synchronization state of the content item should be changed to synchronized. In one variation, a flag can be used with true or 1 to indicate that the content item is synchronized and false or 0 to indicate that the content item is unsynchronized. Content management system 102 can use the synchronization state field or flag to keep client device 104$_i$'s blacklist/whitelist up to date, and correctly synchronize client device 104$_i$'s local copy of the content library.

Content management system 102 can also include authenticator module 122, which can verify user credentials, security tokens, API calls, specific client devices, and so forth, to ensure only authorized client devices and users can access files. Further, content management system 102 can include analytics module 124 to track and report on aggregate file operations, user actions, network usage, total storage space used, as well as other technology, usage, or business metrics. A privacy and/or security policy can prevent unauthorized access to user data stored with content management system 102.

Content management system 102 can include sharing module 126 for managing sharing content publicly or privately. Sharing the content publicly can include making the content accessible from any computing device in network communication with content management system 102. Sharing the content privately can include linking a content item in content storage 116 with two or more user accounts so that each user account has access to the content item. The sharing can be performed in a platform agnostic manner. That is, the content can be shared across multiple client devices 104 of varying type, capabilities, operating systems, etc. The content can also be shared across varying types of user accounts.

While content management system 102 is presented with specific components, it should be understood by one skilled in the art, that the architectural configuration of content management system 102 is simply one possible configuration and that other configurations with more or less components are also possible.

Figure 2:
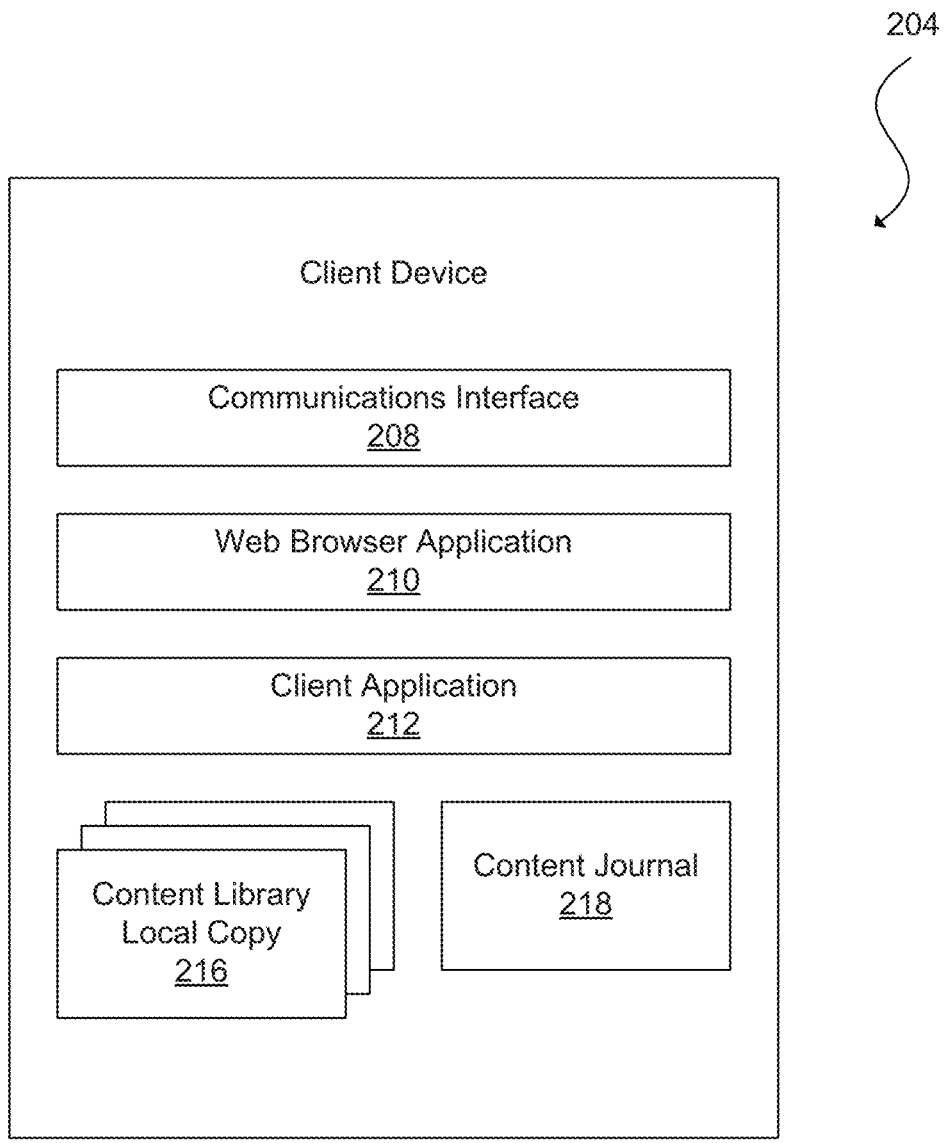
FIG. 2 shows an exemplary configuration of a client device.

FIG. 2 shows an exemplary configuration of a client device 204 (e.g., client device 104$_i$ in FIG. 1). As disclosed above, client device 204 can include a number of components and/or client-side applications for accessing functionality provided by content management system 102 of FIG. 1. The components and/or applications can include one or more databases or storage structures for storing data relevant to the operation of the system (e.g., local copy 216 of a content library), and one or more modules and/or client applications for interacting with the storage structures and/or controlling the features provided by content management system 102 (e.g., communications interface 208, web browser 210, and content management client application 212). Each of the components in FIG. 2 is discussed in more detail below; however, it should be understood by one skilled in art, that the architectural configuration illustrated in FIG. 2 is simply one possible configuration and that other configurations with more or less components are also possible.

Client device 204 can include local copy 216 of at least a portion of a content library (e.g., content library 116 of FIG. 1). As discussed, local copy 216 can include one or more content items, such as directories and files. Local copy 216 can be located within a directory (which can be referred to as a root directory of local copy 216) of a file system of client device 204. As a default behavior, content management system 102 can implement an active or automatic synchronization protocol to synchronize local copy 216, local copies of the content library of other client devices authorized on a user account associated with client device 204, local copies of other client devices authorized on user accounts with whom the user account has shared the content library, and the content library stored by content management system 102. However, a user can opt out of the default behavior and exclude a subset of the content library from synchronization on client device 204 and/or other client devices authorized by the user account.

Client device 204 can include web browser application 210, which can be used to communicate with content management system 102, such as through communications interface 208. In some cases, web browser application 210 can communicate with content management system 102 via HTTP. Web browser 210 can execute client-side scripting languages, such as JavaScript, or other web browser executable languages, and then send the results to content management system 102.

Client device 204 can also include client application 212, which can provide functionality specific to content management system 102. The functionality can include supporting selective synchronization. For example, client application 212 can communicate with content management system 102, such as through communications interface 208, to request that content management system 102 not synchronize a portion of the content library on client device 204 that content management system 102 may have previously synchronized on client device 204. Client application 212 can also request that content management system 102 synchronize a portion of the content library on client device 204 that content management system 102 did not previously synchronize.

In some embodiments, client application 212 can maintain a local copy of content journal 218 or information derived from content journal 218 to facilitate synchronization between and among content management system 102 and authorized client devices. In other embodiments, content management system 102 can maintain content journal 218 for each client device (i.e., on a per device basis) authorized by a user account. Content management system 102 can manage synchronization using content journal 218 to ensure synchronization between local copy 216 of content library 116 stored on client device 204 and content library 116 managed by content management system 102.

In various embodiments, content management system 102 can manage synchronization states of content library 116 on client device 204. For instance, client application 212 can report available memory space on client device 204 to content management system 102 during performance of a synchronization protocol. When the memory of client device 204 reaches capacity or a threshold capacity, content management system 102 can use various heuristics to selectively synchronize a suitable portion of content library 116 on client device 204. These heuristics or filtering rules can be based on a creation time, an access time, or a modification time; a file name, a file extension, or a file directory (e.g., content management system 102 must synchronize or prioritize synchronization of all content items including "School" in the file name, all .mp3's, or all content items in a "work" directory or file); a source, a share status, one or more authorized users, one or more applications, a last modifying user, a number of modifications, a number of sharing users, a share type of a content item, and other filtering rules as described in U.S. patent application Ser. No. 14/067,683, filed Oct. 30, 2013, and entitled "Filtering Content Using Synchronization Data," which is incorporated herein by reference in its entirety.

As another example, content management system 102 can implement selective synchronization using various queuing algorithms. In one embodiment, content management system 102 can use a first-in, first-out strategy to handle instances of when client device 204 has memory constraints. When new content items are added to content library 116, and there is insufficient space for those new content items on client device 204, content management system 102 can queue those new items by setting their synchronization states to unsynchronized. As memory space becomes available on client device 204, content management system 102 can add those items queuing for the longest amount of time to local copy 216. Other queuing schemes that content management system 102 can implement include last-in, first-out, priority-based queuing, smallest content item first, and other queuing techniques known to one of ordinary skill in the art.

Some heuristics or filtering rules may be absolute. For example, a filtering rule may require content management system 102 to synchronize a particular content item on client device 204. However, content management system 102 may determine that updating that particular content item on client device 204 would exceed an available amount or a threshold amount of memory on client device 204. Content management system 102 can cause client device 204 to delete lower priority content items to make room for the particular content item. Content management system 102 can mark the deleted items as unsynchronized on client device 204. Thus, a user would have a local copy of the particular content item on client device 204 and still have access to the deleted items via the content management system or local copies stored on other authorized client devices. As another example of an absolute rule, a filtering rule may dictate that content management system 102 never synchronize a specific content item, such as an enterprise's archives or sensitive files that a user may view while on premises but of which the user can never retain a local copy. In another embodiment, sharing a content item can be improved by setting the default synchronization state for a shared folder to the unsynchronized state. For example, to join a shared folder would previously require the shared folder to be synchronized to a user's content library. By setting the synchronization state for the shared folder to the unsynchronized state upon join, the user can access the shared folder via the web interface before determining whether to have the shared folder synchronized with the user's content library.

Some heuristics or filtering rules can be relative. For instance, a heuristic may designate photos as having higher priority than videos, another heuristic may give documents in a "beta" folder higher priority than documents in an "alpha" folder, and another heuristic can associate work documents with a higher priority than work emails, etc.

In one example, client application 212 may have no knowledge regarding the entirety of content library 116, and client application 212 may rely on content management system 102 to synchronize local copy 216 with a desired subset of content library 116. However, lack of knowledge of the entirety of content library 116 can cause unnecessary processing by content management system 102 and administration by a user. For example, a user may attempt to create a file or directory name having a same name as an unsynchronized content item. This can create a versioning conflict requiring content management system 102 to implement a conflict resolution procedure. In some cases, the user may also have to manually resolve the conflict.

Thus, in another example, client application 212 can be aware of each content item that content management system 102 excludes from synchronization on client device 204. Content management system 102 may cause a stub (e.g., a read-only directory containing no files or a read-only file name placeholder having zero or substantially zero file size) of the excluded content item to be stored in local copy 216 of content library 116. This can enable a user to select the content item for synchronization via a user interface as well as prevent the user from creating a file or directory with a same name as the unsynchronized content item. In one variation, client application 212 can store a local copy of content journal 218 including an entry for each unsynchronized content item or similar information derived from content journal 218. Client application 212 can use the local copy of content journal 218 or similar information to prevent a user from attempting to create a file or directory with a same content path as the unsynchronized content item. When the user modifies the synchronization state of the content item back to synchronized, those entries in the local copy of content journal 218 may be deleted.

Figure 3:
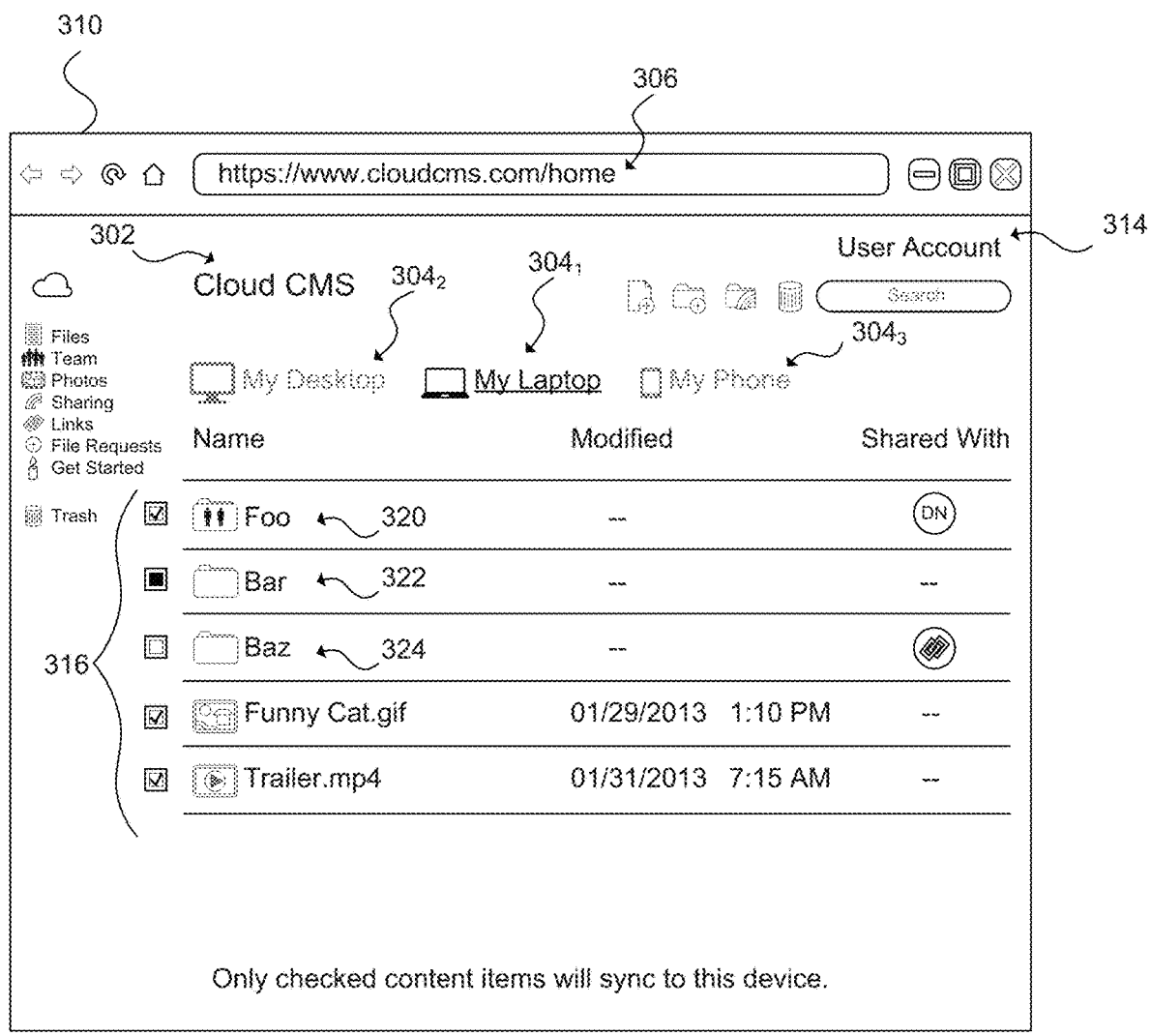
FIG. 3 shows an exemplary web interface for selectively synchronizing a portion of a content library among and between a content management system and multiple client devices.

FIG. 3 shows an exemplary web interface 300 for selectively synchronizing a portion of a content library among and between content management system 302 (e.g., content management system 102 of FIG. 1) and multiple client devices 304 (e.g., client device 204 of FIG. 2). Web interface 300 can be provided by content management system 302. Web interface 300 can be rendered and displayed using web browsing application 310 (e.g., browser 210 of FIG. 2). Web browsing application 310 can correspond to a browser, an application operating on a client device that can be used to navigate content distributed throughout a WAN, such as the Internet. In the example of FIG. 3, browsing application 310 can parse a document including mark-up language (e.g., HTML, XML) that is served by a web server in the WAN to display multimedia content, such as text, images, audio, video, applications, etc. Web browsing application 310 can include an address bar (also referred to as a location bar, URL bar, etc.) for displaying a web location 306 toward which a user may be navigating, browsing, or otherwise interacting. In the example of FIG. 3, a user can log on or sign into her account, user account 314, through content management system 302, and web interface 300 can provide a default (e.g., initial, home, etc.) webpage for user account 314 at web address 306, i.e., "https://www.cloudcms.com/home." Web interface 300 can include client devices $304_1$, $304_2$, and $304_3$ (collectively, "304") authorized by user account 314 and a portion of a local copy 316 of a content library (e.g., content library 116 of FIG. 1) stored on client device $304_1$, here, the user's laptop computer. In one example, a web server of content management system 302 may receive user agent information for client device $304_1$ when web browsing application 310 requests web address 308. The web server may utilize the user agent information to identify client device $304_1$ as the requestor, and select information associated with client device $304_1$ as the default webpage. However, it will be appreciated that the user associated with user account 314 can navigate to webpages for client device $304_2$, a desktop computer authorized by user account 314, or client device $304_3$, a phone authorized by user account 314, by selecting their respective hyperlinks. In another embodiment, content management system 302 may present multiple local copies of content libraries each associated with a respective client device 304$_i$ on a single webpage. Although the example of FIG. 3 shows that content management system 302 can implement similar or substantially similar synchronization techniques for mobile communication devices, such as client device 304$_3$, as those used for computers, such as client devices 304$_1$ and 304$_2$, content management system 302 may use different synchronization techniques for other client devices, such as due to memory constraints or network bandwidth and data usage limitations of those other client devices.

As shown in FIG. 3, local copy 316 of the content library stored on client device 304$_1$ includes a directory (e.g., default directory, root directory, top-most directory, etc.) of content items that are associated with user account 314. Local copy 316 can include directories, sub-directories, files, albums, playlists, media, and/or other data. Although the default/home directory of user account 314 is shown in FIG. 3, it will be understood by one of skill in the art that various other directories, portions of web interface 300, and/or approaches can be utilized to provide or present local copy 316.

In the example of FIG. 3, each content item of local copy 316 of the content library includes a checkbox having various states, such as a selected state for directory 320, a mixed state for directory 322, and an unselected state for directory 324. The checkbox state can correspond to a synchronization state for each content item. For example, the selected or checked state for directory 320 can indicate that a user of user account 314 wants content management system 302 to synchronize the content items, including subfolders and files, in directory 320 for client device 304$_1$. On the other hand, the unselected or unchecked state for directory 324 may indicate that the user of user account 314 prefers that content management system 302 exclude directory 324 and its contents from synchronization on client device 304$_1$. The mixed state for directory 322 can indicate that content management system 302 generally synchronizes directory 322 but directory 322 includes at least one content item that content management system 302 does not synchronize on client device 304$_1$. The user of user account 314 can drill down directory 322 to determine specific content items (e.g., sub-directories and/or files) that are excluded from synchronization on client device 304$_1$.

Figure 4:
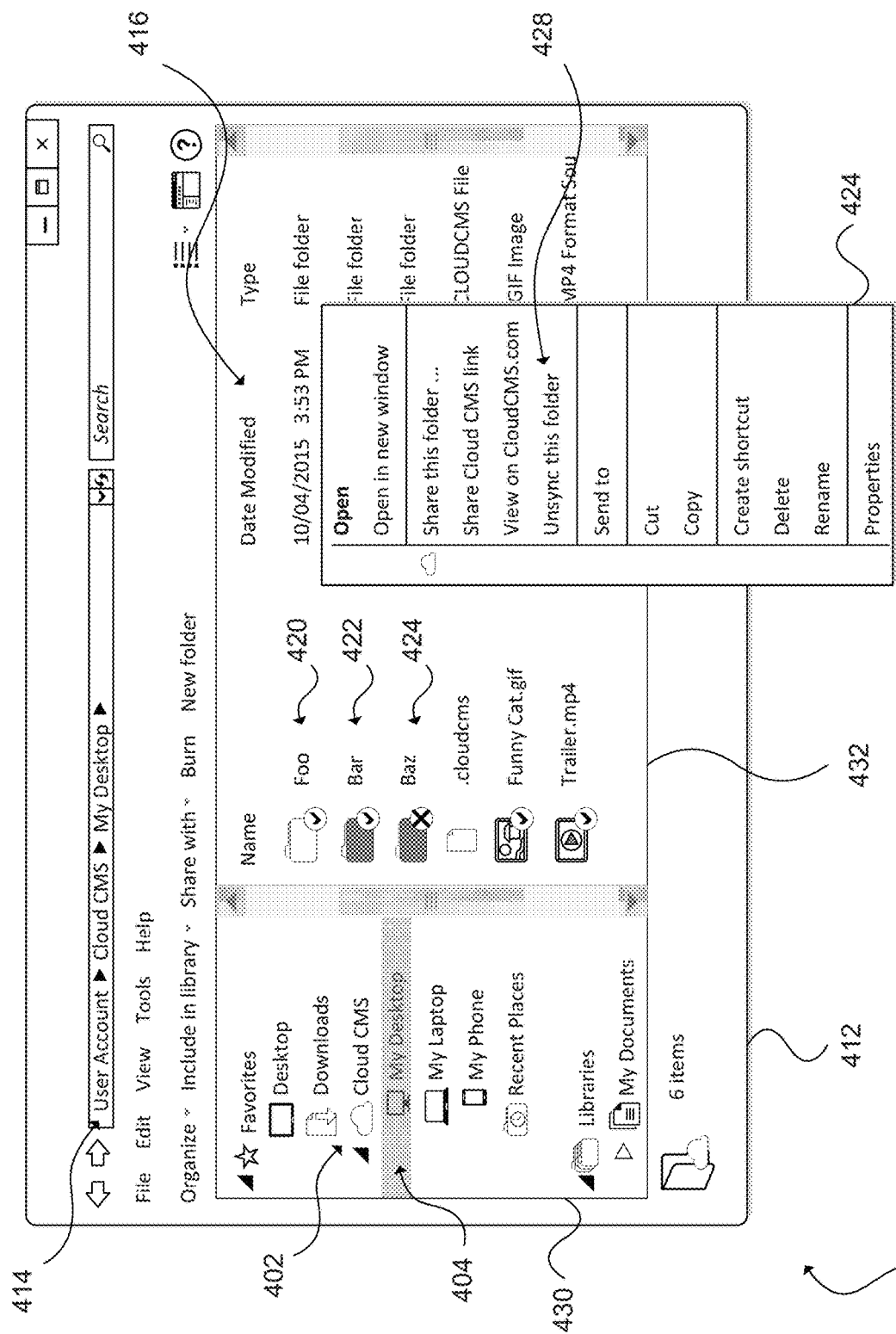
FIG. 4 shows an exemplary client application interface for selectively synchronizing a portion of a content library among and between a content management system and multiple client devices.

FIG. 4 shows an exemplary client application interface 400 for selectively synchronizing a portion of a content library among and between content management system 402 (e.g., content management system 102 of FIG. 1) and multiple client devices 404 (e.g., client device 204 of FIG. 2). Client application interface 400 can be a part of client application 412 (e.g., client application 212 of FIG. 2) installed on client device 404 to interact with content management system 402. As discussed, client application 412 can be integrated into a file system of client device 404 or can be implemented as a stand-alone application. In the example of FIG. 4, a user of user account 414 operates client application 412 on client device 404, the user's desktop computer. As shown in FIG. 4, client application interface 400 also lists other client devices authorized by user account 414. The user of user account 414 can manage, control, or otherwise interact with the local copies of the content libraries of the other authorized client devices from client device 404.

Client application interface 400 also shows various synchronization states for the content items in local copy 416 of the content library, including a selected synchronization state represented by folder icon 420 with a checkmark, a mixed synchronization state represented by grayed out or ghosted folder icon 422, and an unselected synchronization state represent by grayed out or ghosted folder icon 424 with a cross. Folder icon 420 can indicate that content management system 402 synchronizes all content items contained in a corresponding directory for client device 404. Conversely, folder icon 424 can indicate that content management system 402 does not synchronize a corresponding directory or its contents. Folder icon 422 can indicate that the user of user account 414 has designated content management system 402 not to synchronize at least one content item within the corresponding directory. The user of user account 414 can drill down the corresponding directory to determine specific content items that are excluded from synchronization on client device 404.

In the example of FIG. 4, client application interface 400 shows that client application 412 utilizes a native approach for modifying synchronization states of content items in local copy 416 of the content library. For instance, the user of user account 414 has right-clicked on folder icon 420 to pull up context menu 426. Context menu 426 can include menu options for various functionality provided by content management system 402, including menu option 428 for "unsyncing" (e.g., excluding from synchronization) a directory corresponding to folder icon 420 on client device 404. Likewise, when the user of user account 414 right-clicks on folder icon 424, context menu 426 can include a menu option for synchronizing a directory corresponding to folder icon 424 on client device 404. When the user of user account 414 right-clicks on folder icon 422, context menu 426 may include menu options for both unsynchronizing or synchronizing all of the content items contained in a directory corresponding to folder icon 422 on client device 404.

In various other examples, client application 412 may enable the user of user account 414 to modify synchronization states of multiple content items of a content library on another client device or multiple client devices at once. For instance, the user can select multiple content items in local copy 416 of the content library and right-click to synchronize or unsynchronize all of the selected content items. Such an approach can be advantageous for when the user desires to switch from a blacklist model to a whitelist model for synchronization or vice versa. In one example, client application 412 may also allow the user to change synchronization states of local copies content libraries of multiple client devices simultaneously. For example, the user of user account 414 can select multiple client devices from navigation pane 430, right-click on the selected devices, and context menu 426 can present the user of user account 414 menu options for effecting updates of synchronization states of the selected client devices concurrently. In one variation, the user of user account 414 can select content management system 402 in navigation pane 430, and details pane 432 can present icons each representing a client device. The user of user account 414 can select multiple client device icons, right-click on the selected icons, and context menu 426 can display menu options for synchronizing or unsynchronizing the content libraries of the selected client devices. Client application 412 may also allow a user to save a particular configuration or template of synchronization state designations to apply to other client devices individually or en masse.

In some embodiments, selective synchronization can be a function separate from a synchronization protocol applied by a content management system. For example, content management system 102 may provide an API routine specifically for handling selective synchronization. In one implementation, client application 414 can receive a request to change a synchronization state of a content item. Client application 414 may call the API routine provided by content management system 102 and pass a client device identifier, a content path, and an optional flag for explicitly setting the synchronization state. When content management system 102 receives the request, content management system 102 may update client device 404's synchronization blacklist. The next time content management system 102 synchronizes respective local copies 416 of the content library stored on client device 404, content management system 402 can check if there are any content items in client device 404's blacklist. If the blacklist is empty, content management system 402 can proceed with the synchronization routine. If the blacklist is not empty, content management system 402 can call a separate routine for handling selective synchronization.

Figure 5:
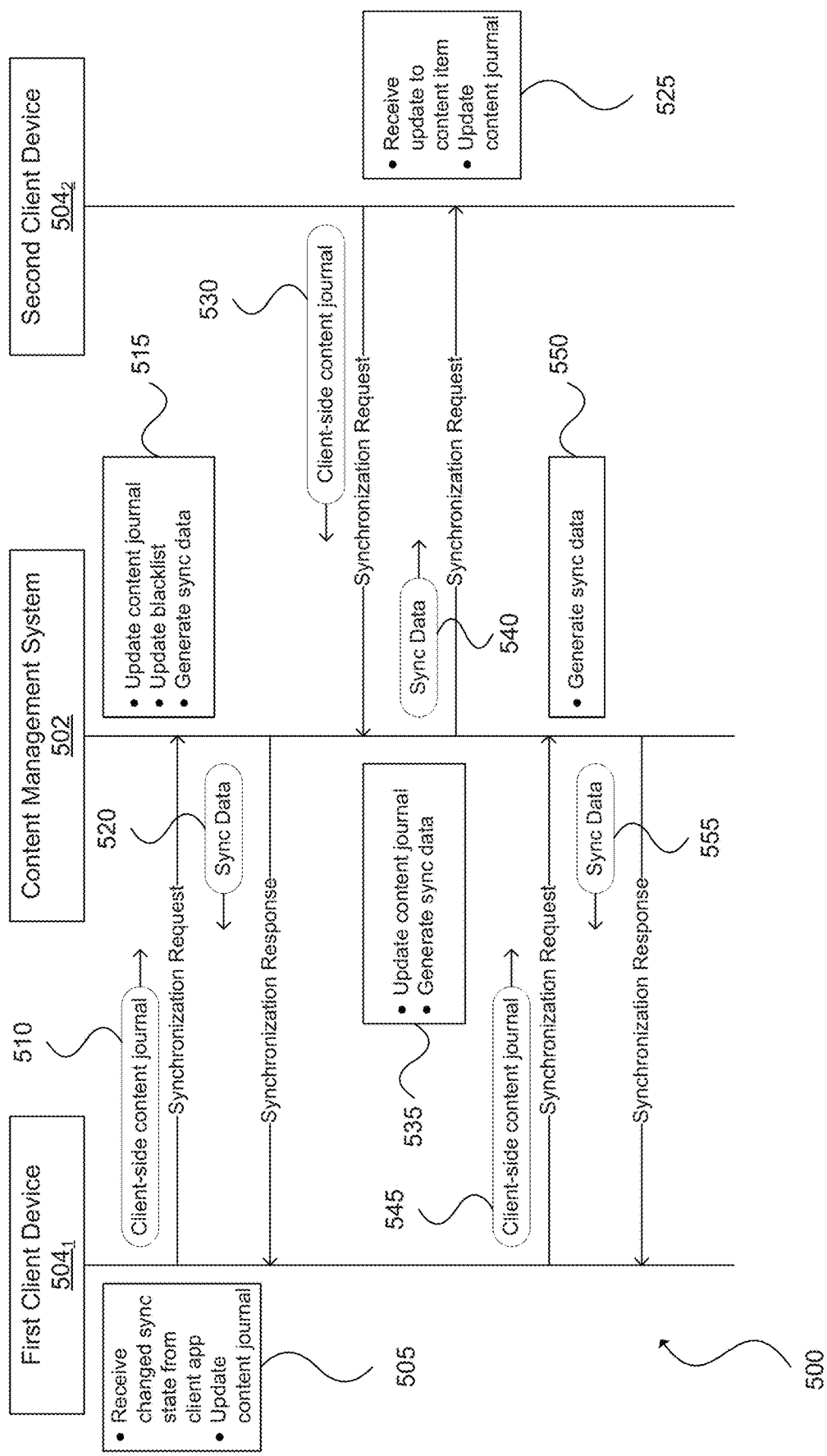
FIG. 5 shows an exemplary flow diagram for selectively synchronizing a portion of a content library among and between a content management system and multiple client devices.

In other embodiments, selective synchronization can be coupled with a synchronization protocol implemented by a content management system. For example, FIG. 5 shows an exemplary flow diagram 500 for selectively synchronizing a portion of a local copy of a content library for a client device that can be utilized within an existing synchronization framework. It should be understood that, for any process discussed herein, there can be additional, fewer, or alternative steps performed in similar or alternative orders, or in parallel, within the scope of the various example embodiments unless otherwise stated. In various embodiments, content management system 502 (e.g., content management system 102 of FIG. 1) can implement a synchronization protocol as described in U.S. patent application Ser. No. 12/856,581, filed Aug. 13, 2010, and entitled "Network Folder Synchronization," and/or U.S. patent application Ser. No. 13/847,294, filed Mar. 19, 2013, and entitled, "Synchronized Content Library," which are incorporated herein by reference in their entirety.

Flow diagram 500 may begin at sequence 505, at which point client device $504_1$ (e.g., client device 204 of FIG. 2) receives a request to change a synchronization state of a content item on client device $504_1$ via a client-side application such as a web browser (e.g., web browsers 210 of FIG. 2 or 310 of FIG. 3) or a client application (e.g., client applications 212 of FIG. 2 or 412 of FIG. 4). The request can be a request that content management system 502 synchronize the content item (i.e., "Item A") or exclude Item A from synchronization depending on a previous synchronization state for Item A. In the example of FIG. 5, the request is to unsynchronize Item A. Client device $504_1$ can add a new entry to a local copy of a content journal (e.g., content journal 218 of FIG. 2) for changing the synchronization state of Item A.

FIG. 6 shows an exemplary content journal 600 including four content entries. Each content entry can include 8 data fields: content pointer 602, content library identifier 604, content journal number 606, content path 608, latest flag 610, directory flag 612, content size 614, and synchronization state field 616. In the example of FIG. 6, content library identifier 604 can be a UUID representing both a user account and a specific client device authorized by the user account. In other embodiments, content library identifier 604 can be associated with a specific user account, and content journal 600 can include an additional field for a specific client device authorized by the specific user account. As discussed, in some embodiments, a client device can include a local copy of content journal 600 to enable selective synchronization. In other embodiments, a content management system can maintain content journal 600 for each client device (on a per client device basis).

Content pointer can identify the location of a content item in content storage (e.g., content storage 116 of FIG. 1). For example, content pointer 602 can include the exact storage address of the content item in content storage 116. In some embodiments, content pointer 602 can point to multiple locations in content storage 116, each of which can contain a portion of the content item. As shown in FIG. 6, content pointer 602 of the first content entry has a value of 0001 which can indicate that the content item associated with the first content entry is located at memory location 0001. Content pointers 602 for the second and fourth content entries, respectively, have null values. This can be because the content items associated with the second and fourth content entries are directories and thus are not associated with files stored in content storage 116. Content pointer 602 of the third content entry has a value of 1002, which can indicate that the third content entry is located at memory location 1002.

Content library identifier 604 can identify the content library to which the content item is associated. Content library identifier 604 can also be used to manage access to the content item. For example, only user accounts associated with the same content library identifier can be allowed access to the content item. As shown, each of the four content entries is associated with the same content library identifier "178" which can indicate that the four content entries are all part of the same content library. In some embodiments, content journal 600 can include content entries associated with various content library identifiers such that the content entries in content journal 600 are not all associated with the same content library.

Content journal number 606 can be a unique number identifying each content entry in content journal 600. In some embodiments, content journal number 606 can also indicate an order in which the content entries are added to content journal 600. For example, content journal number 606 assigned to the first content entry added to content journal 600 can be one and content journal number 606 can be incremented for each new content entry added to content journal 600. In some embodiments, new content entries can be added to the bottom of content journal 600.

Content path 608 can identify the name of the content item as well as a folder hierarchy associated with the content item. For example, content path 608 can include a folder or path of folders in which the content item is placed as well as the name of the content item. As shown in FIG. 6, content path 608 of the first content entry is "/ReadMe.txt." This can indicate that the content item is named ReadMe.txt and that the content item is located in the root folder. Content path 608 of the third content entry is "/Photos/Face.jpeg." This can indicate that the content item is named Face.jpeg and the content item is located in the Photos folder, which is a sub-directory of the root folder. Content path can be used by a client device (e.g., client device 204 of FIG. 2) to present the content items in the content library in the appropriate folder hierarchy.

Latest flag 610 can indicate whether the content entry is the latest content entry associated with the content item. For example, the latest flag can be a Boolean value set to true or 1 to indicate that the content entry is the latest content entry associated with the content item. The latest flag can be set to false or 0 to indicate that the content entry is not the latest content entry associated with the content item. This can be useful in embodiments where a content management system (e.g., content management system 102 of FIG. 1) keeps the old content entry associated with a content item upon creating a new content entry associated with the content item. For example, file management module 120 can set latest flag 610 to true or 1 when creating a new content entry. Content management system 102 can change latest flag 610 of the old content entry associated with the content item to false or 0 to indicate that the old content entry is not the latest content entry associated with the content item.

Directory flag 612 can indicate whether the content item is a directory or folder. For example, directory flag 612 can be a Boolean value that can be set to true or 1 to indicate that the content item is a directory. Alternatively, directory flag 612 can be set to false or zero to indicate that the content item is not a directory. As shown in FIG. 6, the first and third content entries have directory flag values of false, which can indicate that the content items associated with the first and third content entries, respectively, are not directories. The second and fourth content entries have directory flag 612 set to true, which can indicate that the content items associated with the second and fourth content entries, respectively, are directories.

Content size 614 can indicate the size of the content item associated with the content entry. For example, content size 614 can indicate the size of the content item in kilobytes. As shown, the first content entry has a content size of 85, which can indicate that the content item associated with the first content entry has a size of 85 kilobytes. The second and fourth content entries have content sizes of 0. This can be because the second and fourth content entries are directories, as indicated by directory flag 612, and thus have no size. In some embodiments, content size 614 can be used to indicate that a content item has been deleted from a content library. For example, file management module 120 can set the content size to a negative value to indicate that the content item has been deleted.

Synchronization state field 616 can indicate whether a content entry is a change to a synchronization state of a content item associated with the content entry, and if so whether the change causes the content item to be synchronized or not synchronized. For example, synchronization state field 616 can be set to 0 if the content entry is an add, modify, or delete, and not a modification of the synchronization state. Synchronization state field 616 can be set to 1 if the content entry is a modification of the synchronization state, and the modification causes the content item associated with the content entry to be unsynced. Sync field can be set to 2 if the content entry is a modification of the synchronization state, and the modification causes the content item associated with the content entry to be synced. In the example of FIG. 6, synchronization state field 616 for the first, second, and third content entries are set to 0, which can indicate those content entries are not modifications of synchronizations states. Synchronization state field 616 for the fourth content entry is set to 1, which can indicate that the content management system should change the synchronization state of the content item associated with the fourth content entry to unsynchronized. In some embodiments, the content management system can use the sync field to build a file hierarchy of unsynchronized items to avoid the situation of a user creating a content item with the same name as an unsynchronized content item and/or to create stubs for enabling the user to change the synchronization state back of the unsynchronized item back to synchronized.

Returning to FIG. 5, at sequence 510, client device 504$_1$ can initiate a synchronization protocol by sending a synchronization request including the local copy of the content journal or information derived from the content journal to content management system 502. The local copy of the content journal can reflect adds, modifications, and deletes that client device 504$_1$ has made to its local copy of a content library as well as the change to the synchronization state of Item A. As one optimization, if the synchronization state changes from synchronized to unsynchronized, client device 504$_1$ may stop updating the local copy of the content journal with any changes to Item A until the synchronization state of Item A reverts back to synchronized.

Figure 7:
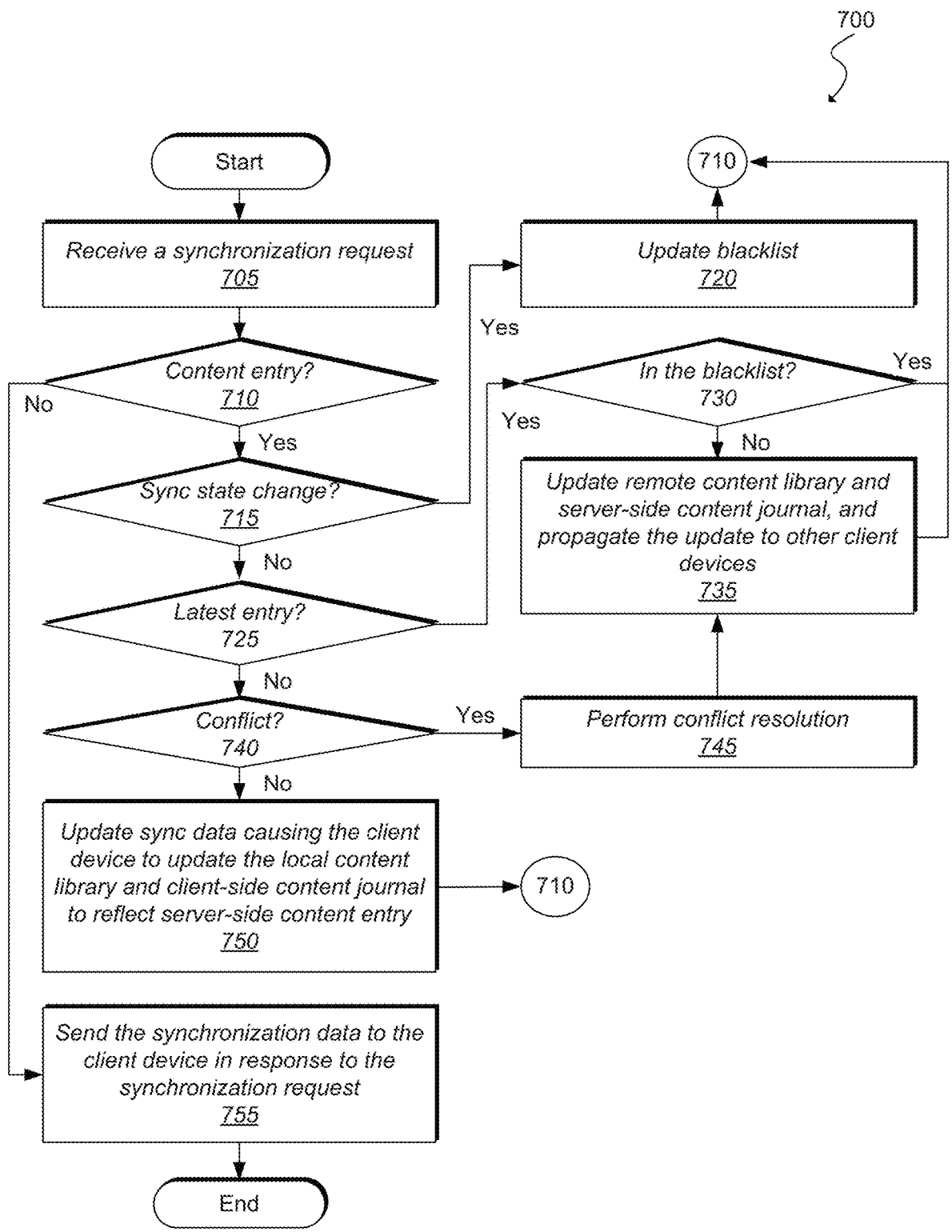
FIG. 7 shows an exemplary method for selectively synchronizing a portion of a content library between a content management system and a client device.

At sequence 515, content management system 502 receives the synchronization request from client device 504$_1$, and content management system 502 can update a blacklist and a content journal and generate synchronization data for client device 504$_1$. FIG. 7 describes an exemplary implementation of sequence 515. At sequence 520, content management system 502 sends the synchronization data to client device 504$_1$. The synchronization data can include one or more synchronization commands, instructions, or other information that client device 504$_1$ can use to update its local copy of the content library. For example, the synchronization data can cause client device 504$_1$ to add, modify, and/or delete content items that are in the synchronized state on client device 504$_1$ to the extent the content journal maintained by content management system 502 has more up to date information for the content items than the local copy of the content journal.

In one example, content management system 502 may send synchronization commands causing client device 504$_1$ to insert content entries of adds and renames of unsynchronized content items to the local copy of the content journal and/or to delete content entries of deleted unsynchronized content items. Client device 504$_1$ can use this information to prevent a user from creating a content item having the same name as an unsynchronized content item and/or to insert stubs to enable the user to change the synchronization state of the unsynchronized content item.

At sequence 525, client device 504$_2$ can receive an update (e.g., add, modify, or delete) to Item A. In the example of FIG. 5, the update can be a modification of Item A. Client device 504$_2$ can update the local copy of the content journal to reflect the update, and at sequence 530, client device 504$_2$ can initiate synchronization with content management system 502 by sending a synchronization request including the local copy of the content journal or information derived from the content journal.

At sequence 535, content management system 502 can receive the synchronization request including the local copy of the content journal or information derived from the content journal. Content management system 502 can process the local copy of the content journal to find only the content entry to modify Item A applicable because client device 504$_2$ has not made any other changes to its local copy of the content library. Content management system 502 can update the client journal with the modification and generate synchronization data for client device 504$_2$. In the example of FIG. 5, there have been no other updates to the content library since a previous synchronization between content management 502 and client device 504$_2$. Thus, the synchronization data may only include synchronization commands, instructions, or other data that client device 504$_2$ can use to update the local copy of the content journal or information derived from the content journal, such as the latest content journal number (e.g., content journal number 606 of FIG. 6) or insertions and deletions of content entries for unsynchronized content items on client device 504$_2$ to the extent any exist. At sequence 540, content management system 502 can send the synchronization data to client device 504$_2$.

At sequence 545, client device 504$_1$ can initiate synchronization with content management system 502 by sending a synchronization request including the local copy of the content journal or information derived from the content journal. In the example of FIG. 5, client device 504$_1$ has not made any updates since the previous synchronization between content management 502 and client device 504$_1$. Content management system 502 can receive the synchronization request at sequence 550. Since the local copy of the content journal does not include any updates, content management 502 does not need to update the content journal. However, there has been an update to the content library of which client device 504$_2$ is unaware, i.e., the modification of Item A that is not synchronized for client device 504$_1$ at sequence 525. Thus, content management system 502 can ignore the modification for client device 504$_1$.

FIG. 7 shows an exemplary method 700 for selectively synchronizing a portion of a content library between a content management system (e.g., content management system 102 of FIG. 1) and a client device (e.g., client device 204 of FIG. 2). Method 700 may begin at step 705, where the content management system receives a synchronization request from the client device. The synchronization request can originate from a client application (e.g., client application 412 of FIG. 4) on the client device to synchronize a local copy of the content library on the client device and the content library maintained by the content management system. The synchronization request can include the local copy of the content journal or information derived from the content journal. In one example, the synchronization data can include a content library identifier corresponding to the content library and a content journal number and a content journal number representing the latest state of the local copy of the content library. For example, the content entry identified by the content journal number can indicate the most recent change to the local copy of the content library stored on the client device.

At step 710, the content management system can process the local copy of the content journal or information derived from the content journal included in the synchronization request and analyze the local copy of the content journal or information derived from the content journal on a content-entry-by content-entry basis. But first, the content management system can check if there is any content entry in the local copy of the content journal or information derived from the content journal. If there are no content entries, method 700 can conclude.

If there is a content entry in the local copy of the content journal or information derived from the content journal, at step 715, the content management system can determine whether the content entry is a modification of the synchronization state of the content item associated with the content entry, such as by checking if the synchronization state field (e.g., synchronization state field 616 of FIG. 6) is greater than 0. If so, at step 720, the content management system can update the blacklist associated with the client device with the content item associated with the content entry. For example, if the synchronization state changes from synchronized to unsynchronized, the content management system can add the content item to the blacklist. Otherwise, the content management system can remove the content item from the blacklist.

If the content entry is not a modification of a synchronization state of the content item, the content entry is an add, modify, or delete. At step 725, the content management system can compare the content entry in the local copy of the content journal to any corresponding content entries in the content journal maintained by the content management system to determine whether the content entry is the most up to date modification of the content item associated with the content entry. That is, the content management system attempts to resolve whether the local copy of the content item and the content item maintained by the content management system were synchronized up to the point of the content entry, and that the content entry represents the latest content entry associated with the content item. If so, at step 730, the content management system can check whether the content item associated with the content entry is listed in the blacklist. If not, at step 735, the content management system can apply the add, modify, or delete to synchronize the content library with the local copy of the content item stored on the client device. If the content item is listed in the blacklist, the content management system can ignore the content entry, and attempt to parse a new content entry at step 710. As discussed, in other embodiments, the content management system may pass metadata for unsynchronized content items for the client device to be aware of the file hierarchy for the unsynchronized content items.

Returning to step 725, if the content entry is not the latest content entry for the associated content item, there can be one of two possibilities—the local copy of the content item and the content item maintained by the content management system can be in conflict, and a conflict check can be performed at step 740. If there is a conflict, at step 745, the content management system can perform a conflict resolution protocol, and, at step 735, the content management system can use the result of the conflict resolution protocol to update the content library and the content journal, and to propagate the result to other authorized client devices.

If there is no conflict, the other possibility is that the content entry may reflect that the client device has made no updates to the content item associated with the content entry, and the content management system can safely apply the update. Thus, at step 750, the local copy of the content library on the client device can be updated to synchronize with the content library maintained by the content management system.

Figure 8A:
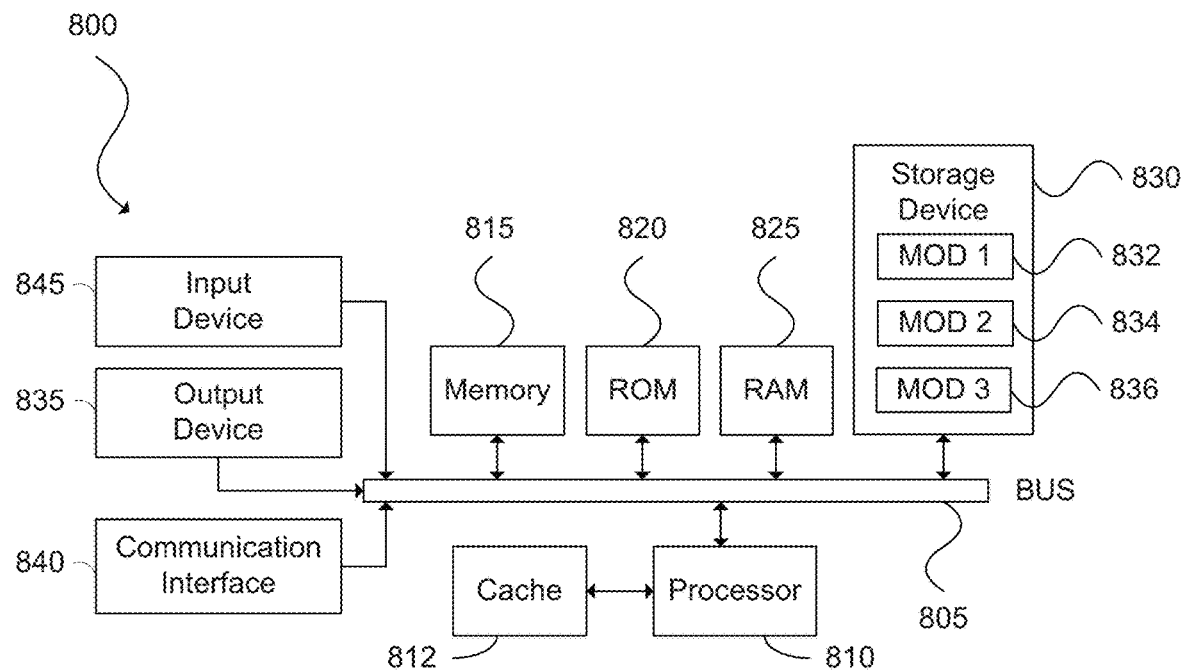
FIG. 8A shows a first exemplary system for implementing various embodiments of the present technology.
Figure 8B:
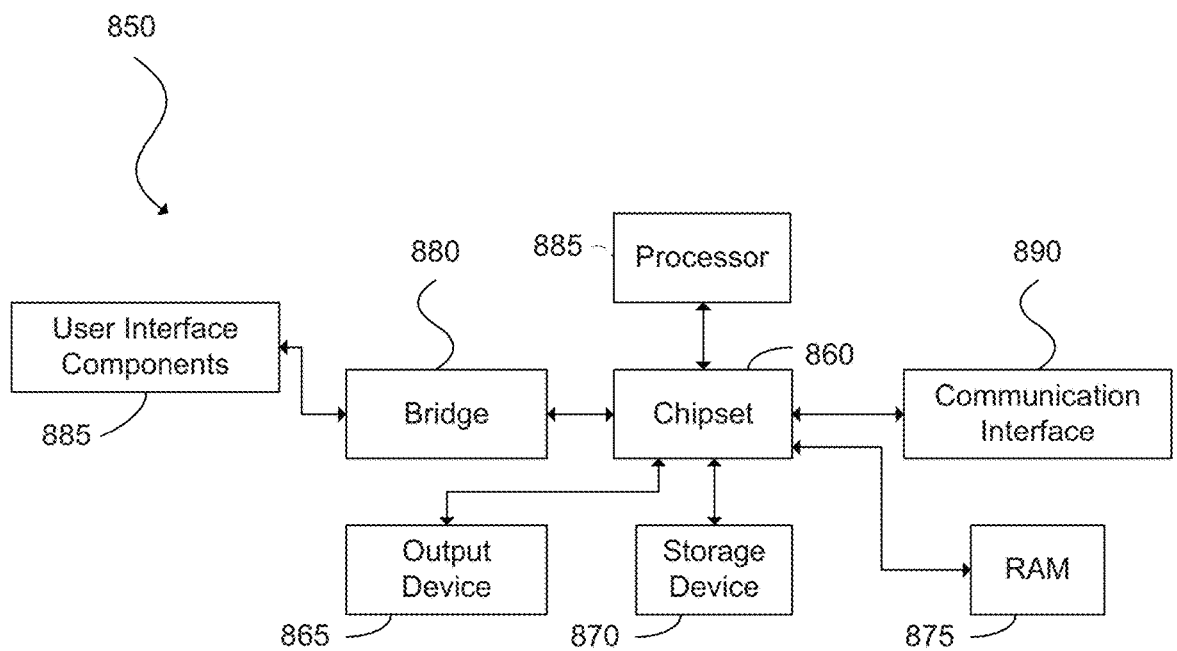
FIG. 8B shows a second exemplary system for implementing various embodiments of the present technology.

FIG. 8A and FIG. 8B show exemplary system embodiments. The more appropriate embodiment will be apparent to those of ordinary skill in the art when practicing the present technology. Persons of ordinary skill in the art will also readily appreciate that other system embodiments are possible.

FIG. 8A illustrates an architecture for conventional bus computing system 800 wherein the components of the system are in electrical communication with each other using bus 805. Exemplary system 800 includes processing unit (CPU or processor) 810 and system bus 805 that couples various system components including system memory 815, such as read only memory (ROM) 820 and random access memory (RAM) 825, to processor 810. Bus computing system 800 can include a cache of high-speed memory connected directly with, in close proximity to, or integrated as part of the processor 810. Bus computing system 800 can copy data from memory 815 and/or storage device 830 to cache 812 for quick access by processor 810. In this way, cache 812 can provide a performance boost that avoids processor 810 delays while waiting for data. These and other modules can control processor 810 to perform various actions. Other system memory 815 may be available for use as well. Memory 815 can include multiple different types of memory with different performance characteristics. Processor 810 can include any general purpose processor and a hardware module or software module, such as module 1 832, module 2 834, and module 3 836 stored in storage device 830, to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction with bus computing system 800, input device 845 can represent any number of input mechanisms, such as a microphone for speech, a touch-sensitive screen for gesture or graphical input, keyboard, mouse, motion input, speech and so forth. Output device 835 can also be one or more of a number of output mechanisms known to those of skill in the art. In some instances, multimodal systems can enable a user to provide multiple types of input to communicate with bus computing system 800. Communications interface 840 can generally govern and manage the user input and system output. There is no restriction on operating on any particular hardware arrangement and therefore the basic features here may easily be substituted for improved hardware or firmware arrangements as they are developed.

Storage device 830 can be a non-volatile memory that can be implemented as a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

As discussed, storage device 830 can include software modules 832, 834, 836 for controlling processor 810. Other hardware or software modules are contemplated. Storage device 830 can be connected to system bus 805. In one aspect, a hardware module that performs a particular function can include the software component stored in a computer-readable medium in connection with the necessary hardware components, such as processor 810, bus 805, output device 835, and so forth, to carry out the function.

FIG. 8B illustrates an architecture for a chipset computing system 850 that can be used in executing the described methods and generating and displaying a graphical user interface (GUI). Computing system 850 is an example of computer hardware, software, and firmware that can be used to implement the disclosed technology. Computing system 850 can include processor 855, representative of any number of physically and/or logically distinct resources capable of executing software, firmware, and hardware to perform identified computations. Processor 855 can communicate with chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. Bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to computing system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage device 870 or RAM 875. Further, the machine can receive inputs from a user via user interface components 885 and execute appropriate functions, such as browsing functions by interpreting these inputs using processor 855.

It can be appreciated that exemplary computing systems 800 and 850 can have more than one processor or be part of a group or cluster of computing devices networked together to provide greater processing capability.

For clarity of explanation, in some instances the present technology may be presented as including individual functional blocks representing devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
  receiving, by a content management system from a client device and via a network, a set of synchronization preferences associated with content items in a content library of a user account on the content management system, the content library being stored on the content management system, wherein the set of synchronization preferences comprises:
    a first preference to synchronize a first portion of the content items in the content library with a local copy of the content library stored on the client device, and
    a second preference to opt out of synchronizing a second portion of the content items in the content library with the local copy of the content library stored on the client device;
  based on the set of synchronization preferences, updating a synchronization state associated with the client device and the content items in the content library, the synchronization state indicating, for each of the content items, whether the client device and the content item are associated with the first preference or the second preference; and
  selectively synchronizing updates to a particular content item with the local copy of the content library stored on the client device based on whether a respective portion of the synchronization state associated with the particular content item comprises the first preference or the second preference, wherein the selectively synchronizing comprises:
    when the respective portion of the synchronization state associated with the particular content item comprises the first preference, allowing the content management system to synchronize updates to the particular content item with the local copy of the content library stored on the client device; and
    when the respective portion of the synchronization state associated with a particular content item comprises the second preference, preventing the content management system from synchronizing updates to the particular content item with the local copy of the content library stored on the client device.

2. The method of claim 1, further comprising:
  determining whether synchronization is authorized for the particular content item based on the synchronization state.

3. The method of claim 2, further comprising:
  determining whether the respective portion of the synchronization state associated with the client device and the particular content item authorizes synchronization of the particular content item with the local copy of the content library stored on the client device.

4. The method of claim 1, wherein the first portion of the content items in the content library comprises one or more content items in the content library, and wherein the second portion of the content items in the content library comprises one or more different content items in the content library.

5. The method of claim 1, wherein the set of synchronization preferences comprises a respective one of the first preference or the second preference for each of the content items in the content library.

6. The method of claim 1, further comprising:
  receiving, by the content management system from a second client device, an update to one or more content items in the content library stored on the content management system;
  updating the one or more content items in the content library according to the received update; and
  for each updated content item from the one or more content items updated, determining whether the synchronization state authorizes that updated content item to be synchronized with a local version of the updated content item stored in the local copy of the content library.

7. The method of claim 1, further comprising:
  detecting a conflict between the particular content item in the content library and a local version of the particular content item stored on the local copy of the content library;
  resolving the conflict to obtain a resolved version of the particular content item;
  updating a content journal associated with the content library to include a content entry associated with the resolved version of the particular content item; and
  updating the synchronization state to include information for updating the local version of the particular content item based on the resolved version of the particular content item.

8. The method of claim 1, further comprising:
  determining that adding a new content item to the local copy of the content library stored on the client device would exceed a threshold amount of memory on the client device; and
  setting a respective synchronization state of the new content item on the client device to an unsynchronized state.

9. A content management system comprising:
  one or more processors; and
  memory comprising instructions stored thereon that, when executed by the one or more processors, cause the content management system to:
    receive, from a client device and over a network, a set of synchronization preferences associated with content items in a content library of a user account on the content management system, the content library being stored on the content management system, wherein the set of synchronization preferences comprises:
      a first preference to synchronize a first portion of the content items in the content library with a local copy of the content library stored on the client device, and
      a second preference to opt out of synchronizing a second portion of the content items in the content library with the local copy of the content library stored on the client device;

based on the set of synchronization preferences, update a synchronization state associated with the client device and the content items in the content library, the synchronization state indicating, for each of the content items, whether the client device and the content item are associated with the first preference or the second preference; and selectively synchronize updates to a particular content item with the local copy of the content library stored on the client device based on whether a respective portion of the synchronization state associated with the particular content item comprises the first preference or the second preference, wherein the selectively synchronizing comprises:

when the respective portion of the synchronization state associated with the particular content item comprises the first preference, allowing the content management system to synchronize updates to the particular content item with the local copy of the content library stored on the client device; and when the respective portion of the synchronization state associated with a particular content item comprises the second preference, preventing the content management system from synchronizing updates to the particular content item with the local copy of the content library stored on the client device.

10. The content management system of claim 9, the memory comprising instructions stored thereon that, when executed by the one or more processors, cause the content management system to:

determine whether synchronization is authorized for the particular content item based on the synchronization state.

11. The content management system of claim 9, the memory comprising instructions stored thereon that, when executed by the one or more processors, cause the content management system to:

determine whether the respective portion of the synchronization state associated with the client device and the particular content item authorizes synchronization of the particular content item with the local copy of the content library stored on the client device.

12. The content management system of claim 9, wherein the first portion of the content items in the content library comprises one or more content items in the content library, and wherein the second portion of the content items in the content library comprises one or more different content items in the content library.

13. The content management system of claim 9, wherein the set of synchronization preferences comprises a respective one of the first preference or the second preference for each of the content items in the content library, and wherein the memory comprises instructions that, when executed by the one or more processors, cause the content management system to:

receive, from a second client device, an update to one or more content items in the content library stored on the content management system;

update the one or more content items in the content library according to the received update;

for each updated content item from the one or more content items updated, determine whether the synchronization state authorizes that updated content item to be synchronized with a local version of the updated content item stored in the local copy of the content library.

14. The content management system of claim 9, the memory comprising instructions stored thereon that, when executed by the one or more processors, cause the content management system to:

detect a conflict between the particular content item in the content library and a local version of the particular content item stored on the local copy of the content library;

resolve the conflict to obtain a resolved version of the particular content item;

update a content journal associated with the content library to include a content entry associated with the resolved version of the particular content item; and update the synchronization state to include information for updating the local version of the particular content item based on the resolved version of the particular content item.

15. The content management system of claim 9, the memory comprising instructions stored thereon that, when executed by the one or more processors, cause the content management system to:

determine that adding a new content item to the local copy of the content library stored on the client device would exceed a threshold amount of memory on the client device; and set a respective synchronization state of the new content item on the client device to an unsynchronized state.

16. A non-transitory computer-readable medium storing instructions that, when executed by one or more processors, cause the one or more processors to:

receive, from a client device, by a content management system via a network, a set of synchronization preferences associated with content items in a content library of a user account on the content management system, the content library being stored on the content management system, wherein the set of synchronization preferences comprises:

a first preference to synchronize a first portion of the content items in the content library with a local copy of the content library stored on the client device, and a second preference to opt out of synchronizing a second portion of the content items in the content library with the local copy of the content library stored on the client device;

based on the set of synchronization preferences, update a synchronization state associated with the client device and the content items in the content library, the synchronization state indicating, for each of the content items, whether the client device and the content item are associated with the first preference or the second preference; and selectively synchronize updates to a particular content item with the local copy of the content library stored on the client device based on whether a respective portion of the synchronization state associated with the particular content item comprises the first preference or the second preference, wherein the selectively synchronizing comprises:

when the respective portion of the synchronization state associated with the particular content item comprises the first preference, allowing the content management system to synchronize updates to the particular content item with the local copy of the content library stored on the client device; and when the respective portion of the synchronization state associated with a particular content item comprises the second preference, preventing the content management system from synchronizing updates to the particular content item with the local copy of the content library stored on the client device.

17. The non-transitory computer-readable medium of claim 16, storing instructions that, when executed by the one or more processors, cause the one or more processors to:
   determine whether synchronization is authorized for the particular content item based on the synchronization state.

18. The non-transitory computer-readable medium of claim 16, wherein the first portion of the content items in the content library comprises one or more content items in the content library, and wherein the second portion of the content items in the content library comprises one or more different content items in the content library.

19. The non-transitory computer-readable medium of claim 16, storing instructions that, when executed by the one or more processors, cause the one or more processors to:
   receive, from a second client device, an update to one or more content items in the content library stored on the content management system;
   update the one or more content items in the content library according to the received update;
   for each updated content item from the one or more content items updated, determine whether the synchronization state authorizes that updated content item to be synchronized with a local version of the updated content item stored in the local copy of the content library.

20. The non-transitory computer-readable medium of claim 16, storing instructions that, when executed by the one or more processors, cause the one or more processors to:
   determine that updating the local copy of the content library stored on the client device would exceed a threshold amount of memory;
   identify one or more content items that can be deleted from the local copy of the content library to reduce a memory usage by an amount that enables the updating of the local copy of the content library without exceeding the threshold amount of memory;
   generate a respective synchronization state for each of the one or more content items, the respective synchronization state comprising an indication that an associated one of the one or more content items has been set for deletion; and
   send, to the client device, synchronization state data including information for updating the local copy of the content library and the respective synchronization state of each of the one or more content items.

\* \* \* \* \*